No. 893,676. PATENTED JULY 21, 1908.
D. L. TSCHANTZ.
CONCEALED FASTENER AND JOINT IN WOODWORK.
APPLICATION FILED DEC. 11, 1907.

Witnesses
Harry O. Rastetter
Sylvia Boron

Inventor
David L. Tschantz
By William H. Miller
Attorney

UNITED STATES PATENT OFFICE.

DAVID L. TSCHANTZ, OF CANTON, OHIO.

CONCEALED FASTENER AND JOINT IN WOODWORK.

No. 893,676.  Specification of Letters Patent.  Patented July 21, 1908.

Application filed December 11, 1907. Serial No. 406,043.

*To all whom it may concern:*

Be it known that I, DAVID L. TSCHANTZ, a citizen of the United States, residing at Canton, in the county of Stark and State of Ohio, have invented a new and useful Concealed Fastener and Joint for Woodwork, of which the following is a specification.

My invention relates to improvements in concealed fasteners and joints for woodwork, for use in the construction of buggy bodies, cabinets, furniture or other work where a mitered joint of great strength, and at the same time a smooth finish of the outside surface are desired.

In my invention head-pieces, let into the wood, as hereinafter described, together with a corner stay are used in conjunction with bolts, rivets or screws for the purpose of adjusting and binding the head-pieces and the stay tightly against the woodwork to be fastened. By means of this arrangement, to be hereinafter more fully set out, the two sides of a mitered corner may be independently adjusted and fastened to a corner stay and a neat joint thus formed which is at the same time very rigid and strong. In the past, similar mitered joints have usually been fastened by means of screws or bolts put through from the outside surface, their heads countersunk and finished over. In time, these heads show through the finish in small, round, uneven spots indicating the location of every fastening and injuring the appearance of the outside finish of the article in which such construction was used.

Figure 1:
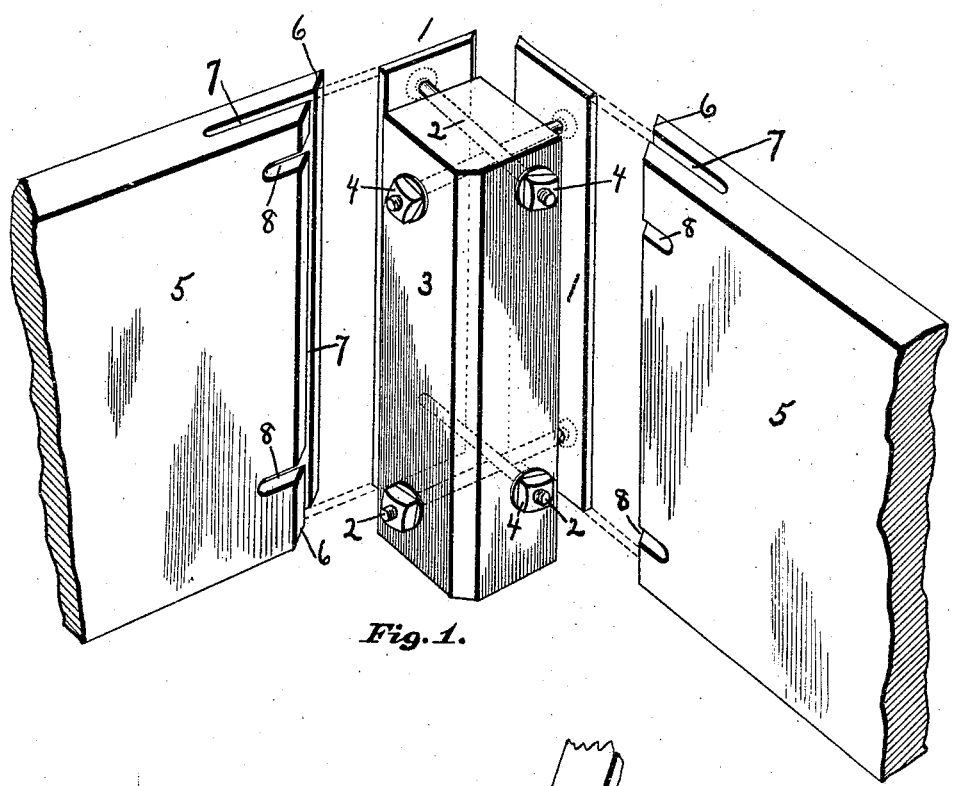
Figure 2:
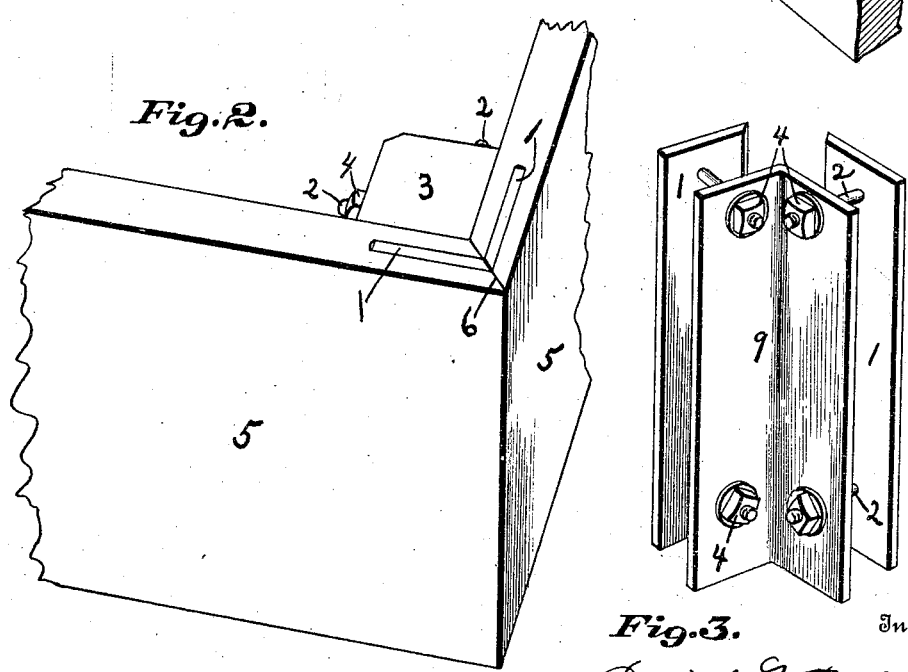
Figure 3:
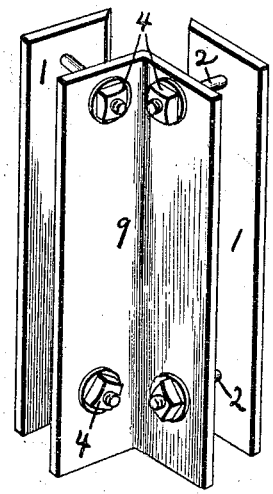

It is my object to do away with this annoying circumstance, and to provide a concealed fastener whereby the two mitered sides of a corner may be adjusted with reference to each other and with reference to a common corner stay, and may be rigidly fastened to said stay in such manner as will produce a very rigid construction. This object I accomplish by the use of the improvement illustrated in the accompanying drawing, in which;

Figure 1 is a perspective view of a disjointed corner on which my fastener is used. Said view is taken from the inner angle of the corner and shows the fastener, with its parts and the location of the bolts and also the manner in which the mitered sides are slotted and notched. Fig. 2 shows a completed corner from the outside, the disjointed parts in Fig. 1 having been assembled. Fig. 3 shows a modification of the corner stay of my concealed fastener.

Similar numbers refer to similar parts throughout the several views.

The head-pieces, 1, together with bolts, rivets or screws, 2, the stay, 3 or 9, and means, such as the nuts shown at 4, to draw up the bolts, if bolts are used, constitute the fastener.

The head-pieces, 1, are flat blades or strips of metal or other suitable material. To these head-pieces the bolts, 2 are attached. The stay, 3, is a corner-piece of wood or metal adapted to fit into the inner angle of the corner formed by the sides, 5, and having holes bored through it at right angles to receive the bolts, 2. The bolts, 2, of the two head-pieces are so arranged that in passing through the stay, 3, they skip each other as shown by the dotted lines in the drawing. The nuts on the bolts are designated by the numeral, 4.

The sides, 5, of the corner are mitered as shown at 6. Into the mitered edges, 6, of the sides, 5, the slots, 7, are cut to receive the head-pieces, 1, in the assembled corner. From the inside surface of the sides, 5, the notches, 8, are cut through to the slots, 7, the said notches being adapted to accommodate the bolts, 2. The head-pieces having been placed in the slots provided for them, the nuts, 4, may be partially drawn up and the sides, 5, may then be slightly adjusted to insure a neat joint at the miter. When the nuts are fully drawn up the head-pieces, 1, will be drawn toward the stay, 3, and a portion of the sides, 5, being between the head-pieces and the stay, the whole will be bound firmly together and the mitered joint closed. The outside surface of the sides, as shown in Fig. 2, will then be perfectly smooth and will take and retain a high finish without at any time showing any blemishes resulting from the method of fastening.

In Fig. 3 a modification of the fastener is shown. In this modification an angle of metal, 9, is used as the stay, 3, shown in the other figures.

It is also to be noted that while I have shown bolts provided with nuts in the drawings, and while such is my preferable construction, I do not wish to limit myself to that construction only. Rivets might well be used in place of the bolts, or machine screws might be run through the holes in the stay and screwed into threaded holes in the head-pieces, or the bolts might be formed integrally with the head-pieces without materially altering my invention.

I claim,—

1. In a concealed fastener and joint in woodwork, sides provided with mitered edges, slots and notches, a corner stay provided with holes, separate head-pieces located in said slots, bolts attached to said head-pieces, said bolts located in said holes in the corner stay and adapted to draw the said sides independently toward said stay.

2. The herein described concealed fastener and joint in woodwork, comprising sides with mitered edges, slots in said mitered edges, notches extending from the inner surfaces of said sides to said slots, a corner stay provided with holes, separate head-pieces, mutually independent, arranged in said slots, bolts attached to said head-pieces and passing through said notches and through said holes in the corner stay, and nuts on said bolts, substantially as and for the purpose specified.

3. In a concealed fastener and joint for woodwork, the combination of the two mitered sides, with slots cut into the two mitered faces, and notches such as described, two separate head-pieces adapted to be let into the said slots, a stay adapted to fit into the inner angle of the corner formed by the said sides, spaced holes in the said stay, and means whereby to draw the said head-pieces toward said stay and rigidly clamp and hold the said sides in position upon said stay and relatively to each other, all substantially as and for the purpose specified.

4. In a concealed fastener and joint in woodwork, the combination of the two mitered sides, with slots cut into the mitered faces thereof, and notches such as described, the two head-pieces adapted to be let into the said slots bolts attached to said head-pieces in longitudinally spaced relation, a stay adapted to fit into the inner angle of the corner formed by the said sides and provided with holes at right angles with each other and so placed and disposed as to receive the said bolts attached to said head-pieces, and nuts upon said bolts adapted to draw the said head-pieces inwardly toward the said stay and thereby to rigidly fasten the whole structure together, all substantially as set forth and described in the specification.

5. In a concealed fastener and joint in woodwork, the combination of the sides, 5, having the notches, 8, and the slots, 7, in the mitered faces, 6, the head-pieces, 1, with the bolts, 2, fastened thereto, the stay, 3, provided with holes to receive said bolts and the nuts, 4, all substantially as and for the purpose specified.

6. A device of the character described, comprising a corner stay adapted to fit into the inner angle of a corner and provided with suitable holes through which pass the bolts attached to the two head-pieces, a plurality of sides provided with miters, slots and notches adapted to receive the said head-pieces and bolts in their application to the said sides, and nuts on said bolts adapted to draw the head-pieces toward the said corner stay and to rigidly bind the whole structure together, substantially as specified.

7. A device of the character described, comprising a pair of sides provided with mitered ends and with slots and notches such as described, and a fastener, comprising head-pieces adapted to engage said slots, and a stay, and means for drawing the head pieces independently toward the said stay so that the sides are mutually adjusted, clamped and fastened to the stay and the miter firmly closed without evidence of the fastener on the outside surface of the sides forming the corner, all substantially as set forth.

8. In a mitered corner, the combination of the mitered sides, 5, each having a slot in the mitered edge and notches as described, the separate head-pieces, 1, the stay, 3, and means for drawing the head-pieces toward the stay all substantially as shown and described.

9. In a device of the character described, a corner stay fitting into the inner angle formed by the two sides of a corner, the said stay being connected by means of bolts therethrough with a pair of head-pieces fitting into slots cut into the mitered faces of the two sides, the two sides having notches cut into them to allow the bolts to connect the head-pieces with the stay and by means of the adjustment between said head-pieces and stay to rigidly fasten the said sides independently to the said stay after they have been mutually adjusted for the purpose of forming a close joint and rigid structure, as set forth in the specification.

DAVID L. TSCHANTZ.

Witnesses:
  WILLIAM H. MILLER,
  SYLVIA BOWN.